(12) United States Patent
Oatway

(10) Patent No.: US 7,181,807 B2
(45) Date of Patent: Feb. 27, 2007

(54) ROPE CLAMP

(76) Inventor: Gerry Oatway, 65 Chinook Dr., Cochrane Alberta (CA) T4C 1E1

(*) Notice: Subject to any disclaimer, the term of this patent is extended or adjusted under 35 U.S.C. 154(b) by 39 days.

(21) Appl. No.: 10/815,913

(22) Filed: Apr. 2, 2004

(65) Prior Publication Data

US 2005/0217079 A1   Oct. 6, 2005

(51) Int. Cl.
*F16G 11/04* (2006.01)
*F16G 11/00* (2006.01)

(52) U.S. Cl. .................................. 24/136 K; 24/136 R

(58) Field of Classification Search ................ 24/308, 24/317, 318, 115 R, 320, 136 R, 136 K, 24/115 H, 115 K, 115 M; 182/5, 192
See application file for complete search history.

(56) References Cited

U.S. PATENT DOCUMENTS

| | | | |
|---|---|---|---|
| 602,694 A | | 4/1898 | Bradeen |
| 610,105 A | | 8/1898 | Thayer |
| 977,642 A | * | 12/1910 | Leisner .................... 24/132 R |
| 2,076,940 A | | 4/1937 | James |
| 2,441,336 A | * | 5/1948 | Sova ........................ 24/129 R |
| 2,962,998 A | | 12/1960 | Long |
| 3,678,543 A | * | 7/1972 | Hobbs ........................ 24/115 R |
| 4,019,609 A | * | 4/1977 | Wagner ..................... 24/136 R |
| 4,678,059 A | * | 7/1987 | Bowker ........................... 182/5 |
| 4,738,216 A | | 4/1988 | Camarota et al. |
| 5,217,092 A | * | 6/1993 | Potter ......................... 188/65.4 |

* cited by examiner

*Primary Examiner*—Robert J. Sandy
*Assistant Examiner*—Ruth C. Rodriguez
(74) *Attorney, Agent, or Firm*—Stephen Lewellyn; Bay Area Patent Group, LLC

(57) ABSTRACT

A clamp for securing a section of rope or the like is provided. The clamp includes a link having two side members connected at a first end by a cross member and attached at an opposite end at an apex. A ring is slidably attached to the link and a finger extends from the ring. In use a loop is formed into a section of rope which is passed between the ring and the cross member and is double backed over the ring so that the finger is positioned within the loop. The rope is then pulled removing the slack in the loop thereby pulling the ring towards the cross member and compressing the loop between the ring and the cross member. As a higher degree of strain is applied to the rope the compression force applied to loop by the by the ring and the arcuate cross member is also increased. This action assures the clamp will continuously clamp the rope in a secure manner. Multiple clamps can be used concurrently to secure a rope or the like at many different points along the length of the rope.

12 Claims, 2 Drawing Sheets

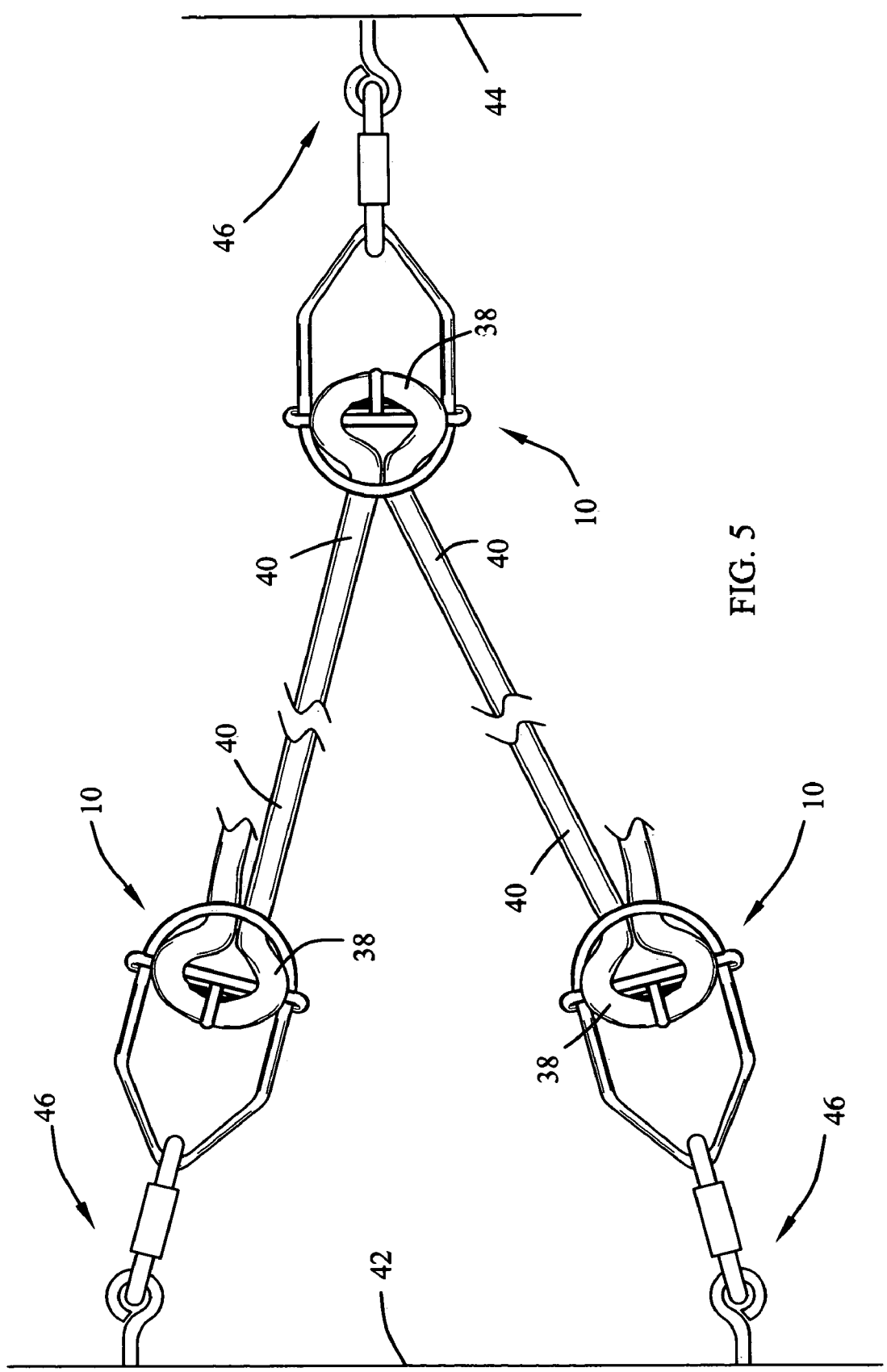

ROPE CLAMP

BACKGROUND OF THE INVENTION

Field of the Invention

The present invention relates generally to a device for securing a section of rope or the like. More particularly, relating to a clamp of simplified construction for securing a section of rope or the like.

SUMMARY OF THE INVENTION

In accordance with the present invention, an apparatus for securing a section of rope to a support structure is provided. The clamp essentially comprises a link having two side members connected at a first end by a cross member and attached at an opposite end at an apex. A ring is slidably attached to the link and a finger extends from the ring. In use a loop is formed into a section of rope which is passed between the ring and the cross member and is double backed over the ring so that the finger is positioned within the loop. The rope is then pulled removing the slack in the loop thereby pulling the ring towards the cross member and compressing the loop between the ring and the cross member.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 illustrates an exemplary use of multiple rope clamps.

The same reference numerals refer to the same parts throughout the various figures.

DETAILED DESCRIPTION OF THE INVENTION

Figure 1:
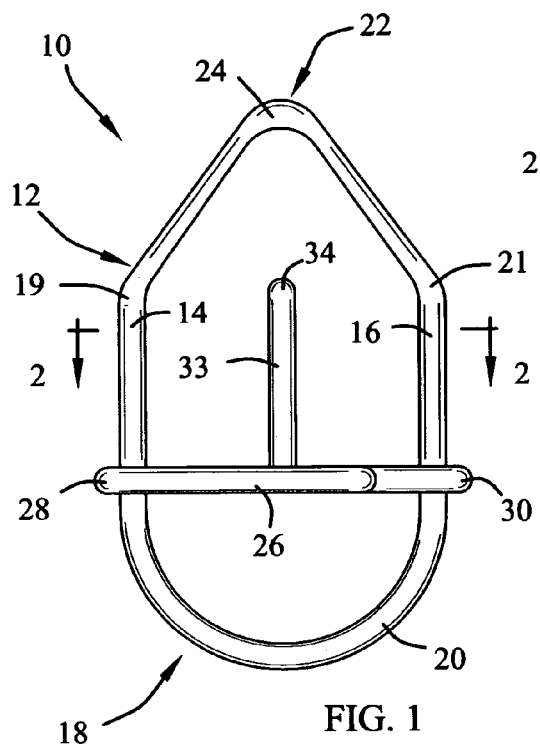
FIG. 1 is a front elevation view of the preferred embodiment of the rope clamp constructed in accordance with the principles of the present invention.
Figure 2:
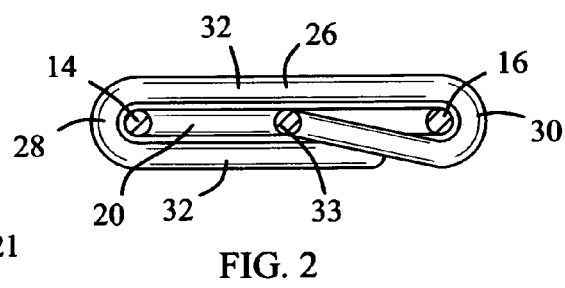
FIG. 2 is a cross sectional view of the rope clamp taken along line 2—2 in FIG. 1.

Referring now to the drawings, and particularly to FIGS. 1 and 2, a preferred embodiment of the rope clamp of the present invention is shown and generally designated by the reference numeral 10.

In FIG. 1, a new and improved rope clamp 10 of the present invention for securing a section of a rope is illustrated and will be described. More particularly, the rope clamp 10 includes a link 12 having two side members 14 and 16, which are connected at first end 18 by an arcuate cross member 20. Each end of the side member 14 and 16 opposite of the first end 18 are bent intermediate the ends thereof and are joined together at a second end 22 forming an apex 24, which is positioned along a center line of the link 12. Preferably, the link 12 is formed of a single piece of wire bent to form the side members 14 and 16 and the arcuate cross member 20 with the opposite ends of the wire terminating at a point forming the apex 24. Most preferably, the side members 14 and 16 are parallel and are formed to lie along a common plane, so that the link 12 is substantially flat.

The rope clamp 10 further includes a ring 26 of a generally oval shape having a first end 28 and a second end 30 joined together by two longitudinal side pieces 32. The ring 26 is slidably engaged with the link 12 by inserting the link between the first and second ends 28 and 30 so that the first and second ends slide along the side members 14 and 16 respectively. Preferably, the ring 26 is formed of a single piece of wire bent to form the first end 28, the second end 30 and the two longitudinal side pieces 32.

A finger 33 extends from one longitudinal side piece 32 towards the apex 24 of the link 12. The finger 33 extends from the side piece 32 parallel to the side members 14 and 16 and lies within the same common plane so that the end 34 of the finger does not substantially project beyond the edges of the side members and is substantially straight. The end 34 can be rounded and blunt so that the end 34 will not mar or puncture surfaces with which is comes into contact with. Additionally, the blunt end 34 is unlikely to scratch, cut or puncture a user's skin, thereby affording a degree of safety to the user. Preferably, the finger 33 is formed integral with the ring 26 by bending a side piece 32 of the ring 26 inward towards the center of the ring and then making a second bend at 90 degrees thereto forming the finger. The inward bend of the side piece 32 of the ring 26 provides for a stop preventing the ring from sliding off of the link 12.

Preferably, the link 12 is formed from a length of wire placed into a die to form side members 14 and 16 and cross member 20 and bends 19 and 21 in the side members intermediate the ends thereof. Preferably, the ring 26 is also formed from a length of wire that is bent to form finger 33 having end 34, which is beveled to a blunt edge. The wire is then formed at 30 to create side pieces 32 and end 28. The ring 26 is then slipped over the link 12 with the side members 14 and 16 positioned between ends 28 and 30. Next the link 12 is welded at apex 24 and the ring 26 is welded intermediate one side piece 32, thereby completing the rope clamp 10.

Figure 3:
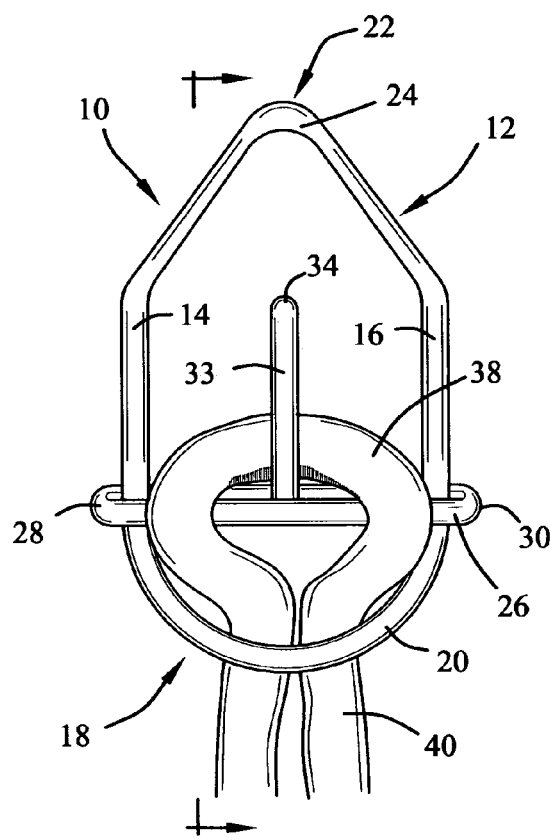
FIG. 3 is a front elevation view illustrating the rope clamp in use.
Figure 4:
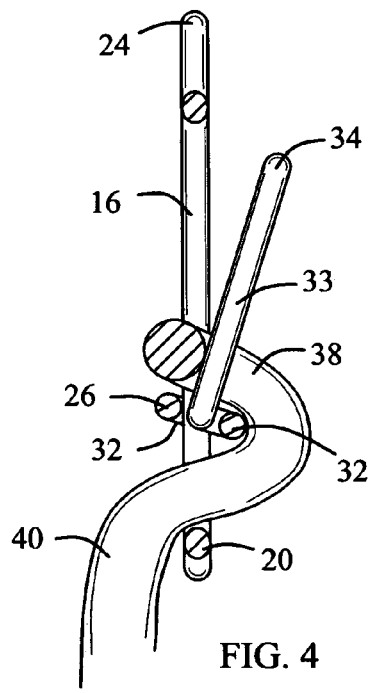
FIG. 4 is a cross sectional view of the rope clamp in use taken along line 4—4 in FIG. 3.

Turning to FIGS. 3 and 4, in use a loop 38 is formed in a section a rope 40. The loop 38 is passed between the ring 26 and the arcuate cross member 30 and is then doubled back over the ring so that the finger 33 is positioned within the loop 38. The rope 40 is then pulled to remove the slack in the loop 38 which causes the ring 26 to slide towards the arcuate cross member 30 compressing a section of the loop between a longitudinal side piece 32 of the ring 26 and the arcuate cross member. As a higher degree of strain is applied to the rope 40 the compression force applied to loop by the by the ring 26 and the arcuate cross member 30 is also increased. This action assures the clamp 10 will continuously clamp the rope 40 in a secure manner.

It is conceivable the rope clamp 10 can be used in an unlimited number situations where a rope or the like needs to be securely retained to an object. For example, the rope clamp 10 can be used to secure a moor line of a water vessel to a dock or a mooring point. Additionally, the rope clamp 10 can be used in securing cargo in the bed of a truck. These examples are included for exemplary purposes only as previously stated, the rope clamp 10 can be used in an unlimited conceivable number of situations where a rope or the like needs to be secured to an object.

Referring to FIG. 5, it is contemplated that a number of rope clamps 10 can be used concurrently to secure a length of rope at various desired points. FIG. 5, illustrates only one example of an unlimited number of examples, where 3 rope clamps 10 are used to secure a rope 40 at various points 46 between two support surfaces 42 and 44. This example, clearly illustrates an important aspect of the rope clamp 10 for securing a section of rope 40 without requiring an end of the rope to be threaded through the clamp. Many prior art rope clamping devices require a free end of a cord or the like to be threaded through the various components of the clamp so that the clamp can effectively secure the rope. With prior art devices the end of a rope would have to be threaded through each device in sequence at the various attachment points.

The rope clamp 10 of the preferred embodiment of the present invention does not require the end of a rope to be threaded through the clamp for the clamp to operate. To attach a rope 40 to the surfaces 42 and 44 at the various points 46 a user only needs to form a loop in the rope by bending a section of the rope back upon itself and then attach the looped section of the rope to the rope clamp 10 in the manner describe supra. This procedure is repeated for each attachment point. This aspect simplifies the secure attachment of a rope to a structure at various points. Additionally, the detachment of the rope at an intermediate point is also simplified in that the rope is not required to be removed from previous or subsequent attachment points to facilitate the removal of the rope from an intermediate point. Rather, the rope only need to be slackened a minimal amount at the attachment point from which it is desired to be removed from. With the minimal slack in the rope, the loop can be removed from the finger 33 and pulled from the clamp 10, thereby detaching the rope from the attachment point. The slack in the rope 40 can then be taken up by pulling the rope through a remaining clamp 10.

While a preferred embodiment of the present invention has been described, it will be understood that various modifications may be made without departing from the spirit and scope of the invention. Accordingly, other embodiments are within the scope of the following claims.

I claim:

1. A clamp for securing a section of rope comprising:
   a link, said link is formed of a single piece of material that is bent to form two side members, a cross member and an apex;
   a ring, said ring is formed of a single piece of material that is bent to form a first end, a second end, and two longitudinal side pieces, said ring is slidably engaged with said link;
   a finger; said finger extending from said ring in a direction towards said apex and terminating at an end; and
   wherein said link is formed from a single piece of wire and wherein said ring is formed from a single piece of wire.

2. The clamp of claim 1, wherein said finger is integral with said ring.

3. The clamp of claim 1, wherein the side members of said link are parallel and lie on a common plane in space.

4. The clamp of claim 3, wherein said finger extends perpendicularly from said ring.

5. A clamp for securing a rope having a section thereof formed into a loop comprising:
   a link having two side members connected at a first end by a cross member and attached at an opposite end at an apex;
   a ring slidably attached to said link, said ring having a first end and a second end joined together by two longitudinal side pieces; and
   a finger extending from one of the longitudinal side pieces of said ring towards the apex of said link, wherein said ring and said finger are integral and are formed from a single piece of wire bent to form the first end, the second end and the two longitudinal side pieces of said ring and said finger.

6. The clamp of claim 5, wherein said side members are parallel and lie along a common plane so that said link is substantially flat.

7. The clamp of claim 6, wherein said link is of a single piece of wire bent to form the two side members, the cross member and further wherein, the ends of the single piece of wire are joined at a point form in the apex.

8. The clamp of claim 5, wherein said finger extends in a direction towards said apex and terminates at an end.

9. A clamp for securing a rope comprising:
   a link having two side members connected at a first end by a cross member and attached at an opposite end at an apex;
   a ring having a first end and a second end joined together by two longitudinal side pieces, said ring being slidably attached to said link such that the two side members of said link are inward of the first and second ends of said ring; and
   a finger extending from a first of the two longitudinal side pieces of said ring in a direction towards said apex of said link, and being positioned between said two side members of said link.

10. The clamp of claim 9, wherein in said two side members of said link are parallel and lie in a common plane.

11. The clamp of claim 9, wherein said finger extends from the first longitudinal side piece at a position intermediate the two longitudinal side pieces.

12. The clamp of claim 9, wherein said cross member being arcuately shaped.

* * * * *